United States Patent
Wang

(10) Patent No.: US 11,243,527 B2
(45) Date of Patent: Feb. 8, 2022

(54) PRODUCTION PROCESS CONTROL METHOD AND PRODUCTION PROCESS CONTROL DEVICE

(71) Applicant: HONGFUJIN PRECISION ELECTRONICS(TIANJIN)CO., LTD., Tianjin (CN)

(72) Inventor: Shih-Cheng Wang, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 385 days.

(21) Appl. No.: 16/512,757

(22) Filed: Jul. 16, 2019

(65) Prior Publication Data
US 2020/0341460 A1    Oct. 29, 2020

(30) Foreign Application Priority Data
Apr. 25, 2019 (CN) .......................... 201910340297.9

(51) Int. Cl.
G05B 23/02    (2006.01)
G05B 17/02    (2006.01)
G06N 3/08    (2006.01)

(52) U.S. Cl.
CPC ......... *G05B 23/0294* (2013.01); *G05B 17/02* (2013.01); *G05B 23/0283* (2013.01); *G06N 3/084* (2013.01)

(58) Field of Classification Search
CPC . G05B 23/0294; G05B 17/02; G05B 23/0283
See application file for complete search history.

(56) References Cited

U.S. PATENT DOCUMENTS

| | | | | |
|---|---|---|---|---|
| 7,356,377 B2* | 4/2008 | Schwarm | ........... | G05B 23/0294 700/108 |
| 7,480,535 B2* | 1/2009 | Kranner | ............. | G05B 13/0265 700/28 |
| 8,855,804 B2* | 10/2014 | Hazen | ................ | G05B 23/0221 700/200 |
| 2004/0078171 A1* | 4/2004 | Wegerich | ........... | G05B 23/0254 702/188 |

(Continued)

*Primary Examiner* — Ronald D Hartman, Jr.
(74) *Attorney, Agent, or Firm* — ScienBiziP, P.C.

(57) ABSTRACT

A production process control method includes acquiring first recorded production process information, extracting second production process information from the first recorded production process information, establishing a matching model for correlating a first satisfied parameter with a second satisfied parameter, establishing a production capability prediction model for predicting production capability, inputting a first production parameter into the matching model to obtain a value of a second production parameter for producing a preset workpiece, inputting the value of the first production parameter and the value of the second production parameter into the production capability prediction model to calculate a complex production capability index (CPK) value, determining whether the CPK value reaches a preset capability standard, and setting the value of the first production parameter and the value of the second production parameter when the CPK value reaches the preset capability standard. The second production process information meets a preset quality standard.

16 Claims, 5 Drawing Sheets

(56) References Cited

U.S. PATENT DOCUMENTS

| | | | |
|---|---|---|---|
| 2005/0038538 A1* | 2/2005 | McDonald, Jr. ... | G05B 13/0255 700/97 |
| 2009/0204234 A1* | 8/2009 | Sustaeta ............. | G05B 13/0285 700/29 |
| 2010/0082120 A1* | 4/2010 | Stephenson .......... | D21G 9/0009 700/29 |
| 2010/0152878 A1* | 6/2010 | Chu ....................... | G05B 17/02 700/110 |
| 2013/0069792 A1* | 3/2013 | Blevins .................. | G06F 17/18 340/815.4 |
| 2019/0286983 A1* | 9/2019 | Jung ........................ | G06N 3/08 |

* cited by examiner

PRODUCTION PROCESS CONTROL METHOD AND PRODUCTION PROCESS CONTROL DEVICE

FIELD

The subject matter herein generally relates to a production process control method and a production process control device.

BACKGROUND

Generally, production of a workpiece in a workshop depends on several factors, such as temperature and humidity of the workshop and parameters of a production device for producing the workpiece. The parameters of the production device may need to be adjusted according to environmental factors of the workshop, which generally cannot be accomplished automatically.

BRIEF DESCRIPTION OF THE DRAWINGS

Implementations of the present disclosure will now be described, by way of embodiments, with reference to the attached figures.

DETAILED DESCRIPTION

Figure 1:
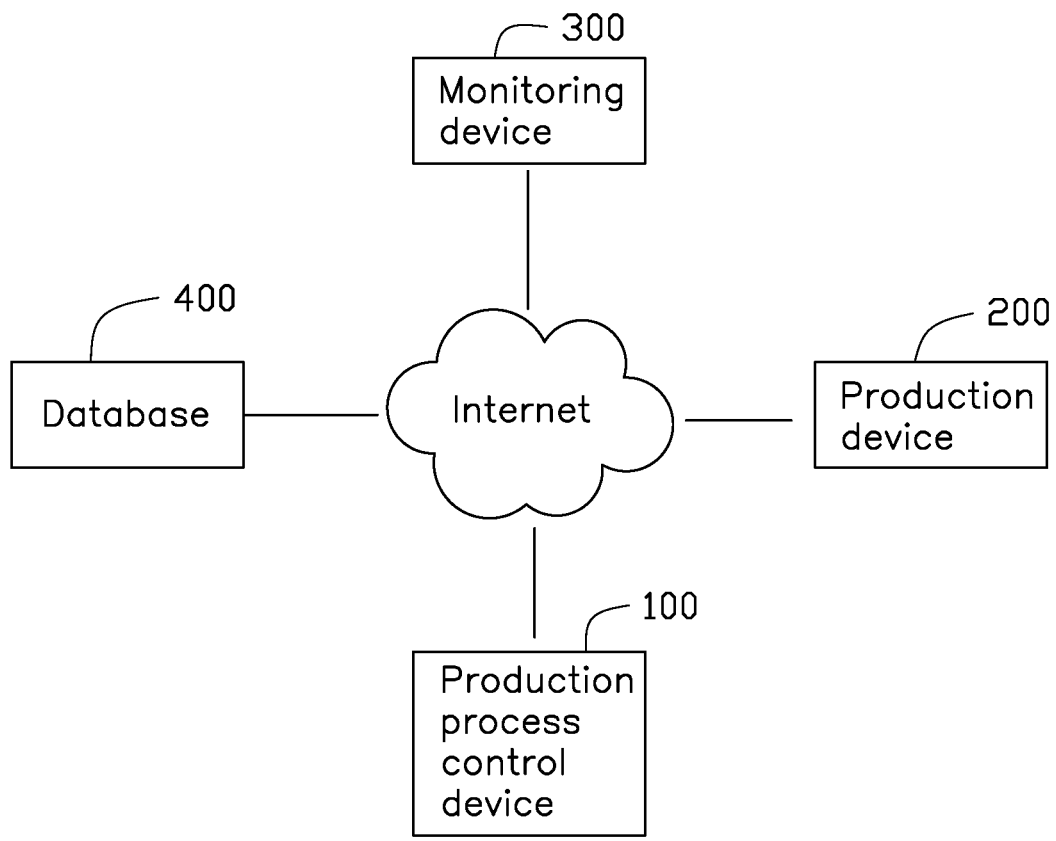
FIG. 1 is a schematic diagram of an embodiment of an operating environment of a production process control device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of an operating environment of a production process control device 100.

The production process control device 100 is communicatively coupled to one or more production devices 200 through a network, such as a local area network within a workshop. The production device 200 may be a workpiece processing device for producing a preset workpiece. The preset workpiece may be a plastic workpiece, a metal workpiece, an electronic workpiece, or the like. The production process control device 100 can feedback process control information and abnormal information of the production device 200 to a monitoring device 300 through the network, so as to realize real-time notification and adjustment. The production process control device 100 can be a computing device such as a personal computer or a server. The monitoring device 300 can be an office computer or a mobile phone. A database 400 stores process-related information of the production device 200. The production process control device 100 communicates with the database 400 to read the process-related information stored in the database 400 and perform operations analysis to implement process control of the production device 200.

Figure 2:
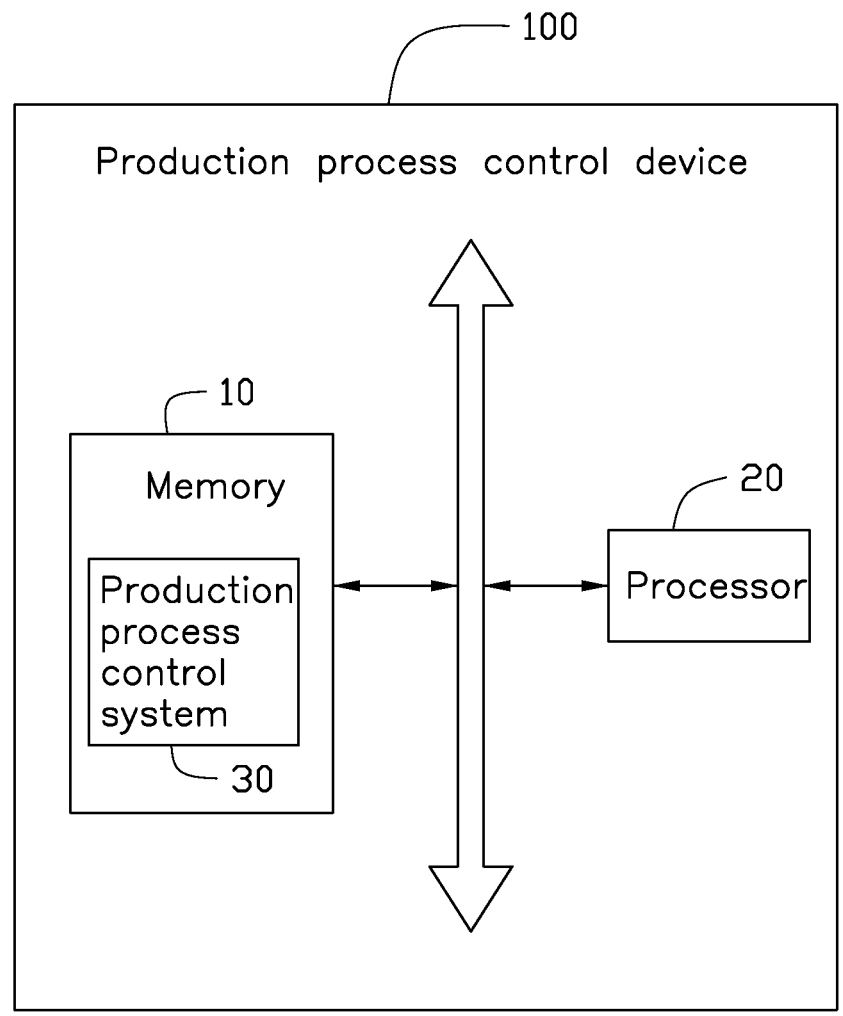
FIG. 2 is a block diagram of the production process control device in FIG. 1.

FIG. 2 shows a block diagram of the production process control device 100.

The production process control device 100 includes a memory 10, a processor 20, and a production process control system 30. The production process control system 30 is a computer program stored in the memory 10 and executable by the processor 20.

Figure 3:
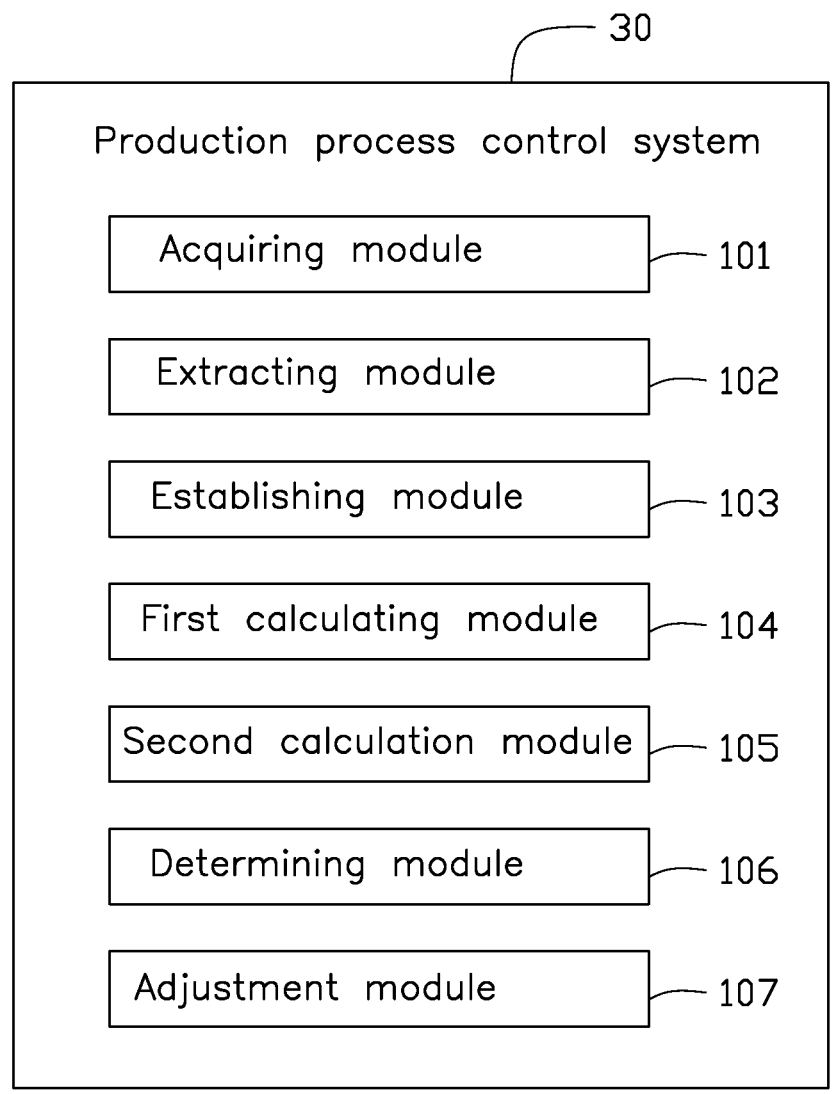
FIG. 3 is a block diagram of an embodiment of function modules of a production process control system.

The production process management system 30 can be partitioned into one or more modules that are stored in the memory 10 and executed by the processor 20 to implement functions of the production process management system 30. The one or more modules may be a series of computer program instruction segments capable of performing a particular function, the instruction segments being used to describe the execution of the production process management system 30 in the production process management device 100. For example, as shown in FIG. 3, the production process management system 30 can be divided into an acquiring module 101, an extracting module 102, an establishing module 103, a first calculating module 104, a second calculating module 105, a determining module 106, and an adjusting module 107.

It should be understood that the figures are only examples of the production process control device 100, and do not constitute a limitation on the production process control device 100, and may include more or less components than those illustrated, or combine or have different components. The production process control device 100 may also include network access devices (not shown), communication buses (not shown), and the like.

The processor 20 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The general purpose processor may be a microprocessor or other kind of processing chip.

The memory 10 can store the production process control system 30. The memory 10 may include a high speed random access memory, and may also include a nonvolatile memory such as a hard disk, a memory, a plug-in hard disk, a smart memory card (SMC), a secure digital (SD), a flash card, a disk storage device, a flash device, or other volatile solid state storage device.

The acquiring module 101 acquires first recorded production process information from a record of production of the preset workpiece by the production device 200.

In one embodiment, a start time and an end time of the record of production is selected according to requirements. For example, the record of production can be set from Jan. 1, 2018 to Dec. 31, 2018. The production process information may include production environment parameters, workpiece material parameters, workpiece test parameters, and production device operation parameters. The production environment parameters may include environmental information of the production device 200, such as a workshop temperature and a workshop humidity of the production device 200. The workpiece material parameters may include parameters of material of the preset workpiece, such as a thermal conductivity, a density, and a specific heat of the material. The workpiece test parameters may include quality test data of the preset workpiece. The production device operating parameters may include operating parameters of the production device 200, such as an operating voltage, an operating current, a pressure, a tool cutting angle, and an internal temperature of the production device 200.

In one embodiment, the first recorded production process information includes a first recorded parameter and a second recorded parameter. The first recorded parameter includes at least one of the production environment parameters, the workpiece material parameters, and the workpiece test parameters. The second recorded parameter includes the production device operation parameters.

The extracting module 102 extracts second recorded production process information from the first recorded production process information. The second production process information meets a preset rule. The preset rule is that a quality test result of the preset workpiece meets a preset quality standard.

Since the first recorded production process information is obtained from the record of production of the preset workpiece, the first recorded production process information includes information of defective workpieces that do not meet the preset quality standard. The information of the defective workpieces is selectively removed, so that the second recorded production process information extracted from the first recorded production process information meets the preset quality standard and is suitable for serving as sample data for subsequent model training.

The second recorded production process information includes a first qualified parameter and a second qualified parameter. The first qualified parameter corresponds to the first recorded parameter meeting the preset standard, and the second qualified parameter corresponds to the second recorded parameter meeting the preset standard.

The establishing module 103 establishes and trains a matching model and a production capability prediction model according to the first qualified parameter and the second qualified parameter of the second recorded production process information. The matching model is a relation between the first qualified parameter and the second qualified parameter. The production capability prediction model is a model based on the first qualified parameter and the second qualified parameter for predicting production capability.

In one embodiment, the matching model and the production capability prediction model are trained based on a back propagation (BP) neural network model. The BP neural network model includes an input layer, a plurality of hidden layers, and an output layer. The input layer is configured to receive a plurality of training features. Each hidden layer includes a plurality of nodes (neurons). Each node in each hidden layer is configured to perform a linear or non-linear transformation on an output from at least one node of an adjacent lower layer in the model. An input of the node of an upper hidden layer may be based on the output of one node or several nodes in the adjacent lower layer, and each hidden layer has a corresponding weight. When training the model, the model can be trained by a supervised learning process to obtain initial weights of each hidden layer. The weights of the hidden layers can be adjusted by a BP algorithm for receiving output signals from the last hidden layer.

In one embodiment, when the model training is completed, the first qualified parameter is input into the matching model, and the second qualified parameter that best matches the first parameter is output.

It should be understood that the second recorded production process information may include information of a plurality of production batches, and the information of each production batch includes the first recorded parameter and the second recorded parameter. A workpiece yield of the preset workpiece of each production batch can be statistically obtained. When the first qualified parameter is input into the matching model, the second qualified parameter that best matches the first qualified parameter is output. Thus, when the first qualified parameter is fixed, the second qualified parameter that best matches the first qualified parameter is determined by the matching model to obtain an optimal workpiece yield.

For example, in a surface mount technology (SMT) production process, the first qualified parameter includes a shop temperature, a shop humidity, a flux content, and a flux melting point, and the second qualified parameter includes a blade angle, a blade speed, a blade pressure, and a distance between a substrate and a steel sheet. After the matching model is completed, the first qualified parameter is input, and the second qualified parameter best matching the first qualified parameter is output by the matching model.

In one embodiment, a complex production capability index (CPK) value of each production batch can be calculated in advance. In the record of production, the CPK value of each production batch corresponds to the first recorded parameter and the second recorded parameter. The establishing module 103 trains the production capability prediction model according to the first qualified parameter and the second qualified parameter. The production capability prediction model performs process capability prediction based on the first qualified parameter and the second qualified parameter. For example, when the production capability prediction model is completed, the first qualified parameter and the second qualified parameter are input into the production capability prediction model to obtain the CPK value.

The first calculating module 104 inputs a value of a first production parameter of a current production plan into the matching model to obtain a value of a second production parameter that is matched with the value of the first production parameter for producing the preset workpiece. The first production parameter corresponds to the first qualified parameter, and the second production parameter corresponds to the second qualified parameter.

For example, the first production parameter includes the production environment parameters, such as a current workshop temperature and a current workshop humidity, and the second production parameter includes the production device operating parameters. The production device operating parameters may be operating parameters required by a customer. In order to obtain the value of the second production parameter that is matched with the value of the first production parameter, the workshop temperature and the workshop humidity are input into the matching model, and the production device operating parameters that are matched with the workshop temperature and the workshop humidity are output.

For example, the workshop temperature is 23 degrees, the workshop humidity is 45%, and the second production parameter includes a blade angle, a blade speed, a blade pressure, and a substrate-to-steel plate spacing. The blade angle and the blade speed are unknown, the blade pressure is 0.04 Mpa, and the substrate-to-steel plate spacing is 400 um. By inputting the first production parameter, the first calculating module 104 calculates the blade angle to be 45 degrees and the blade speed to be 5 rpm.

It should be understood that in the situation when the second production parameter is known and the first production parameter is unknown, the first calculating module 104 can calculate the unknown first production parameter according to the second production parameter.

The second calculating module 105 inputs the value of the first production parameter and the value of the second production parameter into the production capability prediction model to calculate the CPK value.

In one embodiment, after the production capability prediction model is established and trained, the value of the first production parameter and the value of the second production parameter that matches the value of the first production parameter may be selected to calculate the CPK value. The production capability can be determined according to the CPK value.

The determining module 106 determines whether the CPK value reaches a preset capability standard.

In one embodiment, the preset capability standard may be set according to actual usage requirements. For example, the preset capability standard may be set to a CPK value greater than 1.3. The determining module 106 compares the CPK value calculated by the second calculating module 105 to the preset capability standard to determine whether the CPK value reaches the preset capability standard. For example, if the second calculating module 105 calculates that the CPK value is equal to 1.34, then the determining module 106 determines that the CPK value reaches the preset capability standard. If the second calculating module 105 calculates that the CPK value is equal to 1.25, then the determining module 106 determines that the CPK value does not meet the preset capability standard.

When the CPK value reaches the preset capability standard, the adjusting module 107 sets the current production plan according to the value of the first production parameter and the value of the second production parameter that is matched with the value of the first production parameter.

When the CPK value does not meet the preset capability standard, the production process control device 100 outputs a parameter configuration abnormality alert message, and then the value of the first production parameter and/or the value of the second production parameter can be adjusted. The parameter configuration abnormality alert message may be output by short message, email, or in the form of light.

Figure 4:
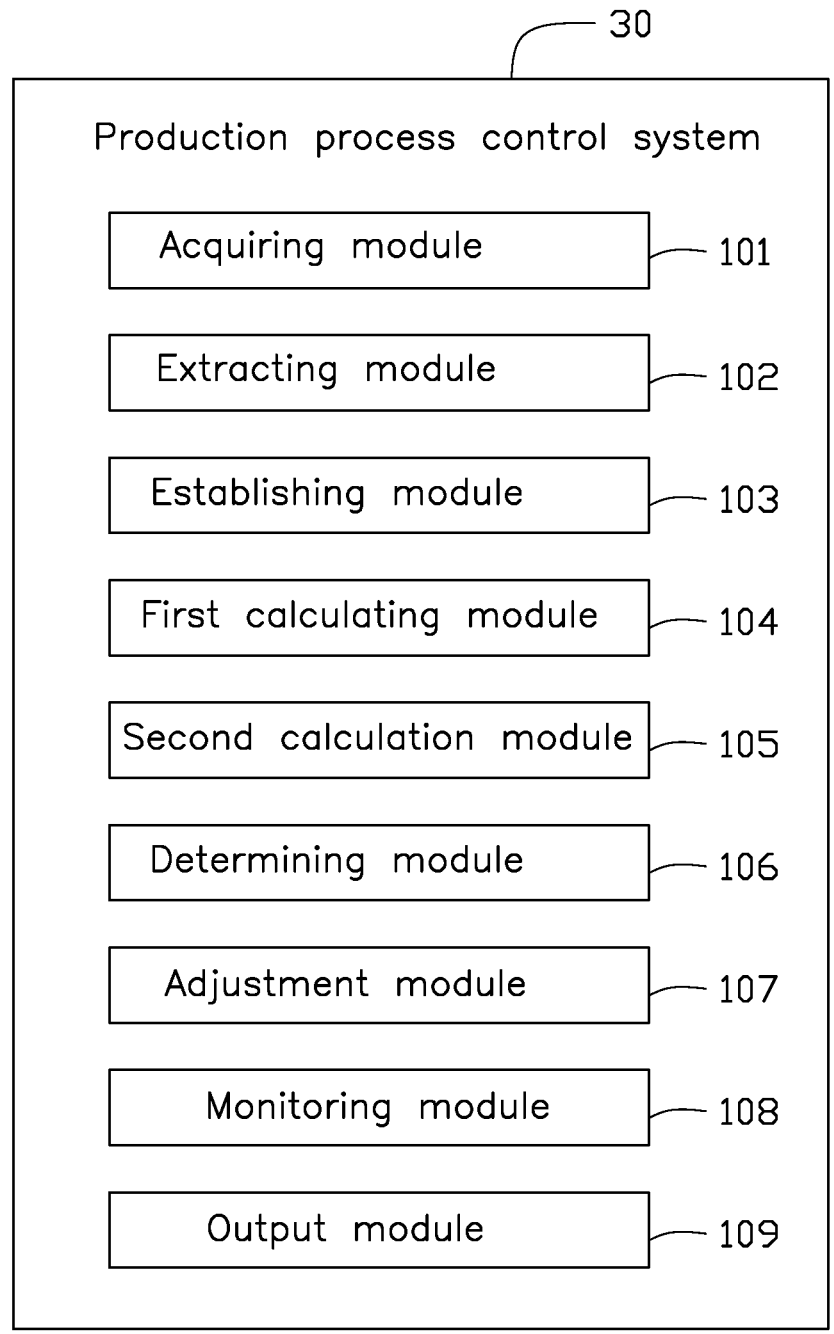
FIG. 4 is a block diagram of another embodiment of function modules of a production process control system.

Referring to FIG. 4, the production process control system 30 further includes a monitoring module 108 and an output module 109.

The monitoring module 108 monitors whether the quality test result of current production of the preset workpiece meets the preset quality standard.

In one embodiment, the monitoring module 108 continuously monitors the quality test result of the current production of the preset workpiece.

In one embodiment, the quality test result is statistically obtained, and the monitoring module 108 compares the quality test result to the preset quality standard to determine whether the quality test result meets the preset quality standard.

The output module 109 outputs the parameter configuration abnormality alert message, and then the value of the first production parameter and/or the value of the second production parameter can be adjusted. The parameter configuration abnormality alert message may be output by short message, email, or in the form of light.

When the monitoring module 108 monitors that the quality test result of the current production stage of the preset workpiece meets the preset quality standard, it indicates that the current production process does not need to be improved, and the production of the preset workpiece may continue.

In one embodiment, the value of the first production parameter and/or the value of the second production parameter may change during a course of production of the preset workpiece. The monitoring module 108 monitors whether the value of the first production parameter and/or the value of the second production parameter changes. When the value of the first production parameter and/or the value of the second production parameter change, the acquiring module 101 acquires the current value of the first production parameter and the current value of the second production parameter. For example, the workshop temperature changes from 24 degrees to 26 degrees, the workshop humidity changes from 45% to 50%, and the value of the second production parameter remains unchanged. The second calculating module 105 inputs the current value of the first production parameter and the current value of the second production parameter into the production capability prediction model to recalculate the CPK value. The determining module 106 determines whether the recalculated CPK value meets the preset capability standard. When the recalculated CPK value does not reach the preset capability standard, the output module 109 outputs the parameter configuration abnormality alert message. When the recalculated CPK value reaches the preset capability standard, the production of the preset workpiece is continued.

In one embodiment, the monitoring module 108 monitors that the value of the first production parameter and/or the value of the second production parameter changes by first determining the preset workpiece, and then detecting whether the value of the first production parameter and/or the value of the second production parameter exceeds a preset change range. When the value of the first production parameter and/or the value of the second production parameter exceeds a preset change range, the monitoring module 108 determines that the value of the first production parameter and/or the value of the second production parameter has changed. The production process control device 100 can realize self-sensing, self-learning, self-decision, self-execution, and adaptive AI process management and control through the modules 101-109.

Figure 5:
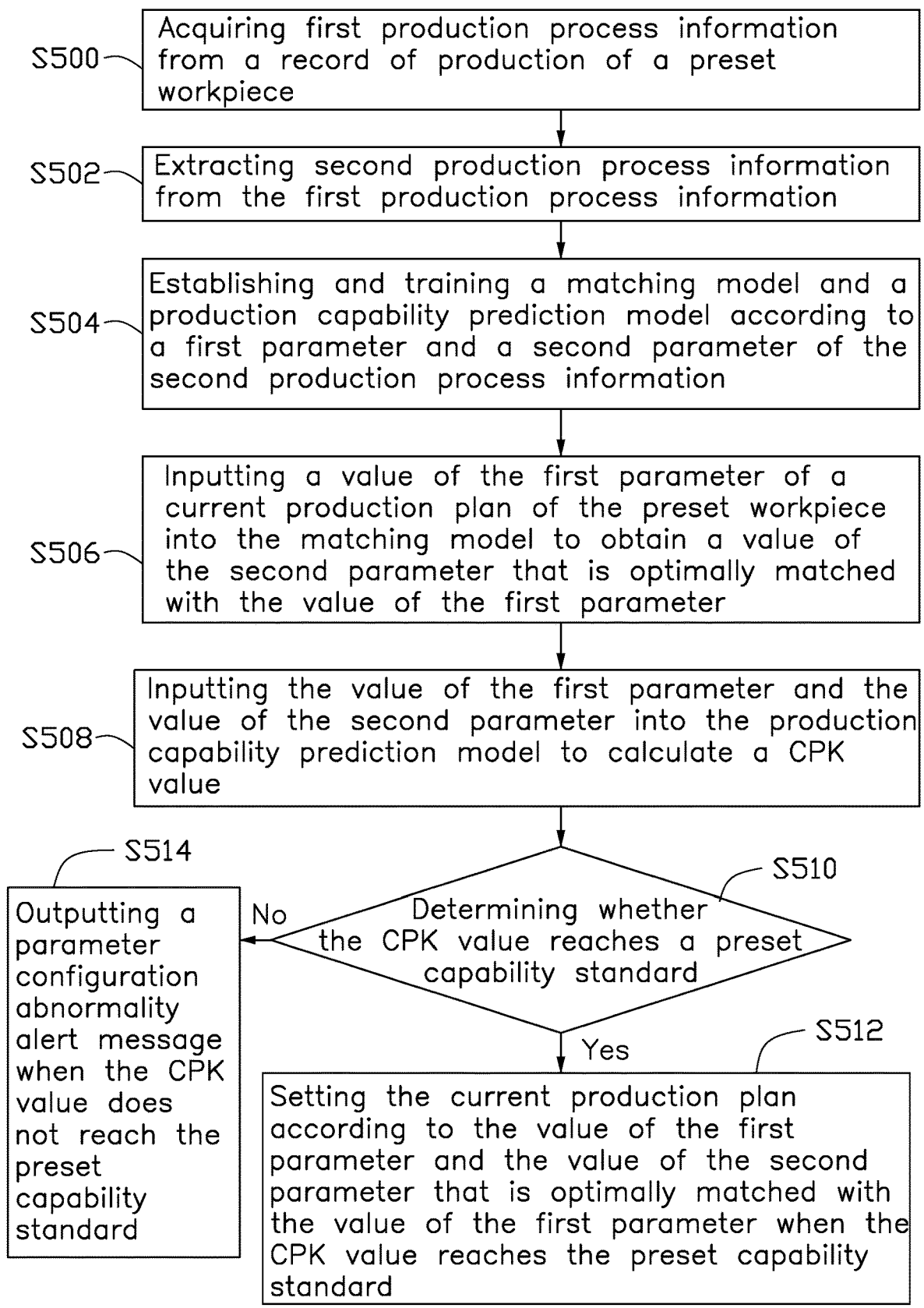
FIG. 5 is a flowchart of a production process control method.

FIG. 5 shows a flowchart of a production process control method. The method is provided by way of embodiment, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S500, the acquiring module 101 acquires the first recorded production process information from a record of production of the preset workpiece. The first recorded production process information includes the first recorded parameter and the second recorded parameter.

At block S502, the extracting module 102 extracts the second recorded production process information from the first recorded production process information. The second recorded production process information meets a preset rule. The preset rule is that a quality test result of the preset workpiece meets a preset quality standard.

At block S504, the establishing module 103 establishes and trains the matching model and the production capability prediction model according to the first qualified parameter and the second qualified parameter of the second recorded production process information. The matching model is a relation between the first qualified parameter and the second qualified parameter. The production capability prediction model is a model based on the first qualified parameter and the second qualified parameter for predicting production capability.

At block S506, the first calculating module 104 inputs the value of the first production parameter of a current production plan into the matching model to obtain the value of the second production parameter that is matched with the value of the first production parameter for producing the preset workpiece.

At block S508, the second calculating module 105 inputs the value of the first production parameter and the value of the second production parameter into the production capability prediction model to calculate the CPK value.

At block S510, the determining module 106 determines whether the CPK value reaches the preset capability standard.

At block S512, when the CPK value reaches the preset capability standard, the adjusting module 107 sets the current production plan according to the value of the first production parameter and the value of the second production parameter that is matched with the value of the first production parameter.

At block S514, when the CPK value does not reach the preset capability standard, the output module 109 outputs the parameter configuration abnormality alert message.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A production process control method comprising:
   acquiring first recorded production process information from a record of production of a preset workpiece, the first recorded production process information comprising a first recorded parameter and a second recorded parameter;
   extracting second production process information from the first recorded production process information, the second production process information meeting a preset quality standard and comprising a first satisfied parameter and a second satisfied parameter, the first satisfied parameter corresponding to the first recorded parameter, and the second satisfied parameter corresponding to the second recorded parameter;
   establishing a matching model according to the second production process information for correlating the first satisfied parameter with the second satisfied parameter, and establishing a production capability prediction model according to the first satisfied parameter and the second satisfied parameter for predicting production capability;
   inputting a value of a first production parameter into the matching model to obtain a value of a second production parameter that is matched with the value of the first parameter for producing the preset workpiece, the first production parameter corresponding to the first satisfied parameter, and the second production parameter corresponding to the second satisfied parameter;
   inputting the value of the first production parameter and the value of the second production parameter into the production capability prediction model to calculate a complex production capability index (CPK) value;
   determining whether the CPK value reaches a preset capability standard; and
   setting the value of the first production parameter and the value of the second production parameter for producing the preset workpiece when the CPK value reaches the preset capability standard.

2. The production process control method of claim 1, wherein:
   the first recorded parameter, the first satisfied parameter, and the first production parameter comprise at least one of production environment parameters, workpiece material parameters, and workpiece test parameters; and
   the second recorded parameter, the second satisfied parameter, and the second production parameter comprise production device operation parameters.

3. The production process control method of claim 1, wherein the record of production of the preset workpiece is obtained from a database.

4. The production process control method of claim 1, wherein:
   the matching model and the production capability prediction model are trained based on a back propagation (BP) neural network model.

5. The production process control method of claim 1, further comprising:
   monitoring whether a quality test result of current production of the preset workpiece meets a preset quality standard; and
   outputting a parameter configuration abnormality alert message when the quality test result does not meet the preset quality standard.

6. The production process control method of claim 1, further comprising;
monitoring whether a value of the first production parameter and/or a value of the second production parameter changes;
acquiring a current value of the first production parameter and a current value of the second production parameter when the value of the first production parameter and/or the value of the second production parameter changes;
inputting the current value of the first production parameter and the current value of the second production parameter into the production capability prediction model to recalculate the CPK value;
determining whether the recalculated CPK value meets the preset capability standard; and
outputting a parameter configuration abnormality alert message when the recalculated CPK value does not reach the preset capability standard.

7. The production process control method of claim 6, wherein the step of monitoring whether the value of the first production parameter and/or the value of the second production parameter changes comprises:
detecting whether the value of the first production parameter and/or the value of the second production parameter exceeds a preset change range; and
determining that the value of the first production parameter and/or the value of the second production parameter has changed when the value of the first production parameter and/or the value of the second production parameter exceeds the preset change range.

8. The production process control method of claim 1, further comprising:
outputting a parameter configuration abnormality alert message when the CPK value does not reach the preset capability standard.

9. A production process control device comprising:
a processor; and
a memory storing a plurality of instructions, which when executed by the processor, cause the processor to:
acquire first recorded production process information from a record of production of a preset workpiece, the first recorded production process information comprising a first recorded parameter and a second recorded parameter;
extract second production process information from the first recorded production process information, the second production process information meeting a preset quality standard and comprising a first satisfied parameter and a second satisfied parameter, the first satisfied parameter corresponding to the first recorded parameter, and the second satisfied parameter corresponding to the second recorded parameter;
establish a matching model according to the second production process information for correlating the first satisfied parameter with the second satisfied parameter, and establishing a production capability prediction model according to the first satisfied parameter and the second satisfied parameter for predicting production capability;
input a value of a first production parameter into the matching model to obtain a value of a second production parameter that is matched with the value of the first parameter for producing the preset workpiece, the first production parameter corresponding to the first satisfied parameter, and the second production parameter corresponding to the second satisfied parameter;
input the value of the first production parameter and the value of the second production parameter into the production capability prediction model to calculate a complex production capability index (CPK) value;
determine whether the CPK value reaches a preset capability standard; and
set the value of the first production parameter and the value of the second production parameter for producing the preset workpiece when the CPK value reaches the preset capability standard.

10. The production process control device of claim 9, wherein:
the first recorded parameter, the first satisfied parameter, and the first production parameter comprise at least one of production environment parameters, workpiece material parameters, and workpiece test parameters; and
the second recorded parameter, the second satisfied parameter, and the second production parameter comprise production device operation parameters.

11. The production process control device of claim 9, wherein the record of production of the preset workpiece is obtained from a database.

12. The production process control device of claim 9, wherein:
the matching model and the production capability prediction model are trained based on a back propagation (BP) neural network model.

13. The production process control device of claim 9, wherein the processor is further caused to:
monitor whether a quality test result of current production of the preset workpiece meets a preset quality standard; and
output a parameter configuration abnormality alert message when the quality test result does not meet the preset quality standard.

14. The production process control device of claim 9, wherein the processor is further caused to;
monitor whether a value of the first production parameter and/or a value of the second production parameter changes;
acquire a current value of the first production parameter and a current value of the second production parameter when the value of the first production parameter and/or the value of the second production parameter changes;
input the current value of the first production parameter and the current value of the second production parameter into the production capability prediction model to recalculate the CPK value;
determine whether the recalculated CPK value meets the preset capability standard; and
output a parameter configuration abnormality alert message when the recalculated CPK value does not reach the preset capability standard.

15. The production process control device of claim 14, wherein the processor monitors whether the value of the first production parameter and/or the value of the second production parameter changes by:
detecting whether the value of the first production parameter and/or the value of the second production parameter exceeds a preset change range; and
determining that the value of the first production parameter and/or the value of the second production parameter has changed when the value of the first production parameter and/or the value of the second production parameter exceeds the preset change range.

16. The production process control device of claim 9, wherein the processor is further caused to:
    output a parameter configuration abnormality alert message when the CPK value does not reach the preset capability standard.

* * * * *